(12) United States Patent
Millard et al.

(10) Patent No.: US 6,723,835 B1
(45) Date of Patent: Apr. 20, 2004

(54) AZOPYRIDONE COMPOUNDS, COMPOSITIONS AND USE

(75) Inventors: Christine Millard, Manchester (GB); Neil Anthony Tallant, Manchester (GB)

(73) Assignee: Avecia Limited, Blackley (GB)

( * ) Notice: Subject to any disclaimer, the term of this patent is extended or adjusted under 35 U.S.C. 154(b) by 0 days.

(21) Appl. No.: 10/088,643

(22) PCT Filed: Sep. 18, 2000

(86) PCT No.: PCT/GB00/03550

§ 371 (c)(1),
(2), (4) Date: Mar. 20, 2002

(87) PCT Pub. No.: WO01/21714

PCT Pub. Date: Mar. 29, 2001

(30) Foreign Application Priority Data

Sep. 20, 1999 (GB) ................................................ 9922136

(51) Int. Cl.⁷ .................... C09B 29/42; C09D 11/02; D06P 5/30; G02F 1/1335; B41J 2/175
(52) U.S. Cl. ................... 534/772; 8/466; 8/495; 8/639; 8/641; 8/673; 106/31.28; 106/31.45; 106/31.48; 347/86; 349/106; 534/649
(58) Field of Search ................. 534/772, 649; 8/639, 641, 673, 466, 495; 106/31.28, 31.45, 31.48; 349/106; 347/86

(56) References Cited

U.S. PATENT DOCUMENTS

| | | | |
|---|---|---|---|
| 3,926,944 A | | 12/1975 | Berrie et al. |
| 4,659,807 A | * | 4/1987 | Segal ........................ 534/642 |
| 6,488,752 B1 | * | 12/2002 | Kenworthy et al. ..... 106/31.48 |
| 6,533,852 B2 | * | 3/2003 | Hirose ..................... 106/31.48 |

FOREIGN PATENT DOCUMENTS

| | | |
|---|---|---|
| DE | 951524 | 10/1956 |
| EP | 0268897 | 6/1988 |
| GB | 1271226 | 4/1972 |
| GB | 1359171 | 7/1974 |
| WO | WO-99/43754 * | 9/1999 |

OTHER PUBLICATIONS

English Abstract of JP 02–153977, Jun. 1990.
English Abstract of JP 01–303407, Dec. 1989.

* cited by examiner

Primary Examiner—Fiona T. Powers
(74) Attorney, Agent, or Firm—Pillsbury Winthrop LLP

(57) ABSTRACT

Compositions containing a solvent and at least one compound of Formula (1)

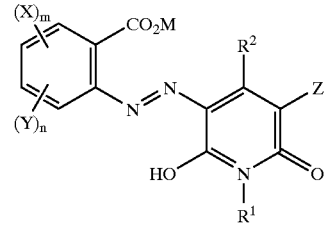

Formula (1)

in which:

$R^1$ represents H, an optionally substituted $C_{1-8}$carbyl derived group, or a group of Formula A:

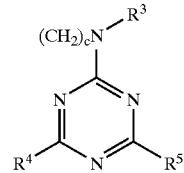

Formula A in which c is from 2 to 6; $R^3$ represents H or optionally substituted $C_{1-8}$carbyl derived group; $R^4$ and $R^5$ independently represent an optional substituent; $R^2$ represents an optionally substituted $C_{1-8}$carbyl derived group; X, Y and Z independently represent H or an optional substituent; M represents H or a cation; and m and n independently represent 0, 1 or 2, are useful as colorants for color filters for displays. Compounds of Formula (1) wherein at least one of $R^1$, $R^2$, X, Y or Z, represent $SO_3M$ or $PO_3M_2$ are also provided.

17 Claims, No Drawings

AZOPYRIDONE COMPOUNDS, COMPOSITIONS AND USE

CROSS REFERENCE TO RELATED APPLICATIONS

This application is a national phase application based on PCT/GB00/03550, filed Sep. 18, 2000, and which further claims priority from British Application No. 9922136.8, filed Sep. 20, 1999. These applications in their entirety are incorporated herein by reference.

This invention relates to compounds, compositions, patterned substrates (such as displays and colour filters) comprising these colorants and to methods of making thesame.

The ability to produce brightly coloured patterns or images on substrates, where the colour has high resistance (fastness) to light, water, heat and/or solvents is important in many areas of for instance the electronics and printing industries. Examples of this are in the production of colour filters, in ink-jet printing and in electrophotographic imaging. Thus it is important to discover colorants which can be readily used (and/or formulated into inks for use) in such applications.

Colour filters, alternatively known as optical filters, are a component of coloured liquid crystal displays (LCDs) used as flat screen displays, for example, in small television receivers or portable computers.

Dyes of the following formulae are known:

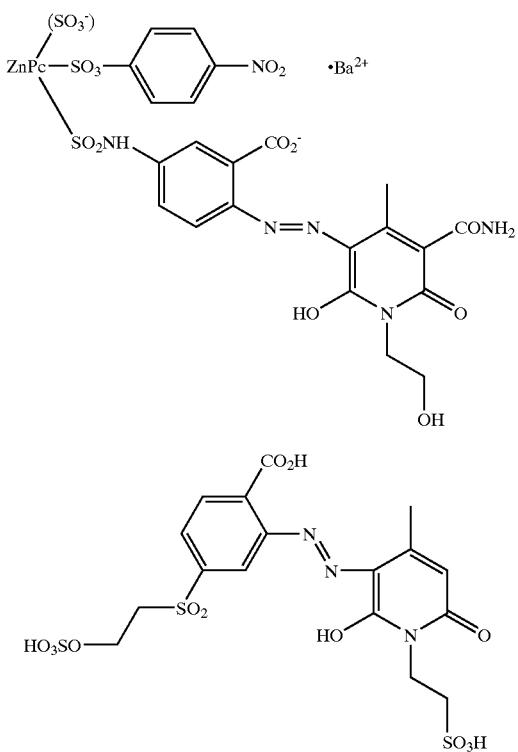

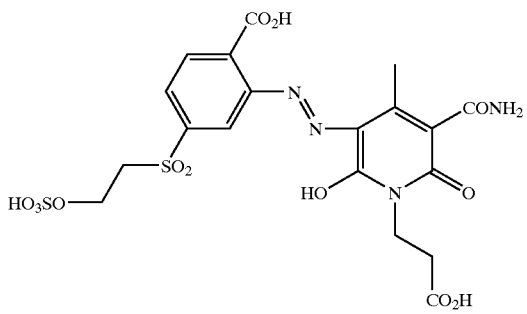

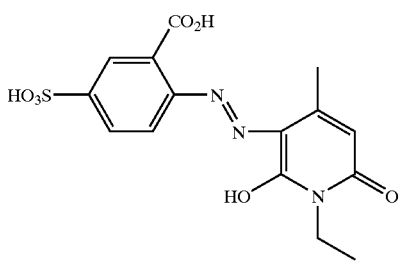

Dyes of structures II & III are water soluble monoazo pyridones used as cellulose reactive dyes as described in EP 169,457 B1 (Hoechst). The dye of structure IV is described in GB 1,359,171 (Ciba-Geigy), as a dye for wool or cellulosics. The dye of structure I in which a pyridone moiety is bound to a zinc phthalocyanine is described in JP-A 01-303407 (Nippon Kayaku) as a one component green dye for colour filters. This is different from the present invention in which a yellow dye is used as a separate component of a green ink for colour filters. This offers much greater flexibility in adjusting the precise shade of the ink and also is advantageous over zinc phthalocyanines which are less favoured due to poor light fastness.

Known mixtures of copper phthalocyanines and azopyridone yellow dyes (such as the dyes exemplified in JP2701387B2 [Mitsubishi Kasei Corp]) are unsatisfactory for use in colour filter applications because of poor light fastness. However, green colour filters containing azopyridone yellow dyes are significantly brighter than those produced using alternative yellow chromophores such as azobenzenes, azopyrazolones, metallised azo dyes and yellow pigments, which are prevalent in the art.

It is desirable therefore to find improved colorants for use in colour filters, in particular colorants which can be used either alone for example as a yellow or as a yellow component in a mixture (e.g. with cyan colorants such as phthalocyanines). It is a preferred object of a preferred aspect of the invention to discover a green colorant comprising a mixture of one or more yellow colorants with one or more cyan colorants which is of particular use in a colour filter, optionally with improved properties such as light fastness and/or brightness.

The present invention provides azopyridone compounds of use in preparing patterned colored substrates such as colour filters. The compounds give stable inks with advantageous properties. As a preferred aspect of the present invention the applicant has surprisingly discovered certain simple pyridone dyes containing carboxy groups ortho to the azo linkage have a significant advantage in terms of light fastness versus related ortho-sulpho analogues, with no loss in brightness.

According to the present invention there is provided a composition comprising a solvent and at least one compound of Formula (1)

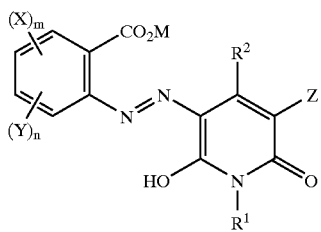

Formula (1)

in which:
R$^1$ represents H, an optionally substituted C$_{1-8}$carbyl derived group, or a group of Formula A:

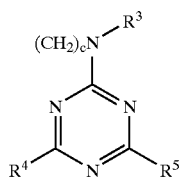

Formula A where:
c is from 2 to 6;
R$^3$ represents H or optionally substituted C$_{1-8}$carbyl derived group;
R$^4$ and R$^5$ independently represent an optional substituent;
R$^2$ represents an optionally substituted C$_{1-8}$carbyl derived group;
X, Y and Z independently represent H or an optional substituent group;
M represents H or a cation; and
m and n independently represent 0, 1 or 2.

The azopyridones of Formula (1) are particularly suitable for use in colour filters, giving very bright yellow films with good light fastness, and as components of ink-jet inks. Conveniently compounds of Formula (1) are not pyridinium pyridones (i.e. Z is not pyridinium).
Preferred compounds of Formula (1) are those in which:
R$^1$ represents H, optionally substituted alkyl, a group of Formula [R$^9$O]$_a$R$^6$, or a group of Formula A
R$^2$ represents alkyl, especially C$_{1-4}$alkyl more especially methyl, or CH$_2$SO$_3$M,
X and Y independently represent SO$_3$M, CO$_2$M, PO$_3$M$_2$, SO2NR$^6$R$^7$, CONR$^6$R$^7$, CO$_2$R$^6$, COR$^6$, alkyl, alkoxy, NR$^6$COR$^7$, halogen, NO$_2$, NR$^7$R$^8$;
where R$^6$ and R$^7$ independently represent H, optionally substituted C$_{1-6}$alkyl, optionally substituted aryl; and R$^8$ represents R$^6$ or a substituted triazinyl group;
Z represents CN, CONH$_2$, H or CH$_2$SO$_3$M;
R$^3$ represents H or optionally substituted C$_{1-8}$carbyl derived group;
R$^4$ and R$^5$ independently represent halo, SO$_3$M, NR$^6$R$^7$, OR$^6$ or SR$^7$;
M represents H, alkali metal ion, ammonium, or a quaternary ammonium cation (hereinafter QAC); more preferably M is Li$^+$, Na$^+$, K$^+$ or NH$_4^+$;
m, n is 0, 1 or 2;
a is an integer from 1 to 10, more preferably from 1 to 5, especially 2 to 3;and each R$^9$ is independently ethylene or propylene:

with the proviso that at least one of R$^1$ to R$^8$, X, Y or Z comprises a group of Formula SO$_3$M or PO$_3$M$_2$; and the compound of Formula (1) is other than a compound of Formula II, III or IV as described herein.

Preferred QAC's are those containing C$_{1-30}$ alkyl chains. More preferred QAC cations may be selected from one or more of the following: N,N-diethyl-N-dodecyl-N-benzylammonium; N,N-dimethyl-N-octadecyl-N-(dimethylbenzyl) ammonium; N,N-dimethyl-N,N-didecyl ammonium; N,N-dimethyl-N,N-didodecyl ammonium; N,N,N-trimethyl-N-tetradecylammonium; N-benzyl-N,N-dimethyl-N-(C$_{12-18}$alkyl)ammonium; N-(dichlorobenzyl)-N,N-dimethyl-N-dodecylammonium; N-hexadecyl pyridinium; N-hexa decyl-N,N,N-trimethylammonium, dodecylpyridinium; N-benzyl-N-dodecyl-N,N-bis (hydroxyethyl)ammonium; N-dodecyl-N-benzyl-N,N-dimethylammonium; N-benzyl-N,N-dimethyl-N-(C$_{12-18}$alkyl)ammonium; N-dodecyl-N,N-dimethyl-N-(1-naphthylmethyl) ammonium and N-hexadecyl-N,N-dimethyl-N-benzylammonium cations.

Suitable QAC cations may also be formed from suitable amines for example from one or more amines selected from: isononylamine, dodecylamine, octadecylamine, didecylamine, didodecylamine, tetradecylamine, hexadecylamine, mixed C$_{12-18}$alkylamines and N-benzyl amines. Preferred amines which may be used to from suitable QAC comprise N-C$_{1-6}$alkyl primary amines, N,N-di-C$_{1-8}$alkyl secondary amines and N-benzyl amines. Particularly preferred amines comprise methyl and ethyl amine derivatives.

Preferably at least one of R$^1$, R$^2$, X, Y or Z comprises a group of Formula SO$_3$M or PO$_3$M$_2$ where M is independently as represented herein; when n is 0; m is 1; X is a sulpho group para to the azo group; Z is H and R$^2$ is methyl then R$^1$ is other than ethyl and the compound of Formula (1) is other than a compound of Formula II, III or IV as described herein.

More preferred compounds of Formula (1) are of Formula (2):

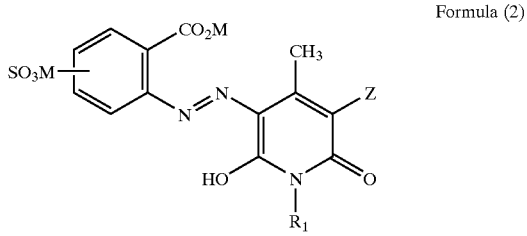

Formula (2)

in which
Z is CONH$_2$, CN or H;
R$^1$ is optionally substituted C$_{2-8}$alkyl (preferably hydroxy substituted) or a glycol group (for example CH$_2$CH$_2$OCH$_2$CH$_3$ or CH$_2$CH$_2$OCH$_2$CH$_2$OH);
with the proviso that if the SO$_3$M group is in the 4-position of the benzene ring then either R$^1$ is other than ethyl or Z is other than H.

In general, preferred compounds of the invention are those which give particularly bright yellow films and prints, and are easily synthesised from readily available intermediates. Solubility in an aqueous ink is also desirable, hence compounds of Formula (1) comprise at least one SO$_3$M or PO$_3$M$_2$ group, comprise substituent (e.g. R$^1$) of C$_8$ (or less) carbyl-derived groups. To improve solubility optionally R$^1$ comprises at least one PEG and/or OH group.

Compounds of the present invention can be prepared by analogy to any of the methods known in the art, for example as in GB 1,271,226.

According to a further aspect of the present invention there is provided a compound of Formula (1) as hereinbefore defined with the provisos that:

at least one of $R^1$, $R^2$, X, Y or Z comprises a group of Formula $SO_3M$ or $PO_3M_2$ where M is independently as represented herein;

when n is 0; m is 1; X is a sulpho group para to the azo group; Z is H and $R^2$ is methyl then $R^1$ is other than ethyl; and the compound of Formula (1) is other than a compound of Formula II, III or IV as described herein.

Preferences for the substituents in Formula (1) are as hereinbefore defined in relation to the composition. Especially preferred compounds of the invention are of Formula (2) as hereinbefore defined.

Preferably the solvent comprises water or more preferably water and one or more water soluble organic solvents.

The viscosity of the composition is preferably less than 100 cp, more preferably less than 50 cp, especially less than 20 cp, more especially less than 15 cp and most preferably less than 10 cp at 20° C.

Preferably the composition has been filtered through a filter having a mean pore size below 10 $\mu$m, preferably below 5 $\mu$m, more preferably below 2 $\mu$m, especially below 0.5 $\mu$m. In this way particulate matter is removed which could otherwise block fine nozzles in an ink-jet printer.

The composition preferably has a total concentration of divalent and trivalent metal ions, other than those bound to the pigment, below 5000, more preferably below 1000, especially below 100, more especially below 20 parts per million by weight relative to the total weight of the composition. Pure compositions of this type may be prepared by using high purity ingredients and/or by purifying the composition after it has been prepared.

Suitable purification techniques are well known, for example ultrafiltration, reverse osmosis, ion exchange and combinations thereof.

When in the formulae herein there is a list of labels (e.g. $Ar^1$ and $Ar^2$) or indices (e.g. 'n') which are said to represent a list of groups or numerical values, and these are said to be "independent in each case" this indicates each label and/or index can represent any of those groups listed: independently from each other, independently within each repeat unit, independently within each Formula and/or independently on each group which is substituted; as appropriate. Thus in each of these instances many different groups might be represented by a single label (e.g. $Ar^1$).

The term 'halo' as used herein signifies fluoro, chloro, bromo and iodo.

The terms 'optional substituent' and/or 'optionally substituted' as used herein (unless followed by a list of other substituents) signifies the one or more of following groups (or substitution by these groups): carbyl, carboxy, sulpho, phospho, formyl, hydroxy, amino, imino, nitrilo, mercapto, cyano, nitro, halo and/or combinations thereof. These optional groups include all chemically possible combinations in the same moiety of a plurality (preferably two) of the aforementioned groups (e.g. amino and sulphonyl if directly attached to each other represent a sulphamoyl radical).

The term carbyl as used herein denotes any monovalent or multivalent organic radical moiety which comprises at least one carbon atom either solely (e.g. —C≡C—) or optionally combined with at least one other non-carbon atom (e.g. alkyl, carbonyl etc.). The non-carbon atom(s) may comprise any elements other than carbon (including any chemically possible mixtures or combinations thereof) that together with carbon can comprise an organic radical moiety. Preferably the non-carbon atom is selected from at least one hydrogen and/or heteroatom, more preferably from at least one: hydrogen, phosphorus, halo, nitrogen, oxygen and/or sulphur, most preferably from at least one hydrogen, nitrogen, oxygen and/or sulphur. Carbyl groups include all chemically possible combinations in the same group of a plurality (preferably two) of the aforementioned carbon and/or non-carbon atom containing moieties (e.g. alkoxy and carbonyl if directly attached to each other represent an alkoxycarbonyl radical).

Preferably 'carbyl-derived' moieties comprise at least one of the following carbon containing moieties: alkyl, alkoxy, alkanoyl, carboxy, carbonyl, formyl and/or combinations thereof; optionally in combination with at least one of the following heteroatom containing moieties: oxy, thio, sulphinyl, sulphonyl, amino, imino, nitrilo and/or combinations thereof.

The term 'hydrocarbyl' as used herein (which is encompassed by the term 'carbyl-derived') denotes any radical moiety which consists only of at least one hydrogen atom and at least one carbon atom. A hydrocarbyl group may however be optionally substituted.

More preferably 'hydrocarbyl derived' moieties comprise one or more of the following carbon containing moieties: alkyl, aryl, alkaryl and/or combinations thereof. The term 'aryl' as used herein signifies a radical which comprises an aromatic hydrocarbon ring, for example phenyl, naphthyl, anthryl and phenanthryl radicals. The term 'alkyl' or its equivalent (e.g. 'alk') as used herein may be readily replaced, where appropriate, by terms denoting a different degree of saturation and/or valence e.g. moieties that comprise double bonds, triple bonds, and/or aromatic moieties (e.g. alkenyl, alkynyl and/or aryl) as well as multivalent species attached to two or more substituents (such as alkylene).

Any radical group mentioned herein as a substituent refers to a monovalent radical unless otherwise stated. A group which comprises a chain of three or more atoms signifies a group in which the chain may be straight or branched or the chain or part of the chain may form a ring. For example, an alkyl group may comprise: propyl which includes n-propyl and isopropyl; butyl which includes n-butyl, sec-butyl, isobutyl and tert-butyl; and an alkyl group of three or more carbon atoms may comprise a cycloalkyl group. The total number of certain atoms is specified herein for certain substituents, for example $C_{1-n}$alkyl, signifies an alkyl group having from 1 to n carbon atoms. Preferred alkyl groups in compounds of Formulae (1) and (2) may be branched or straight chain and preferred branched chain alkyl groups are α-branched alkyl groups.

Advantageously the optional substituents and/or carbyl derived groups which may be present in Formula (1) herein may be each independently selected from: carboxy, sulpho, phospho, nitro, bromo, chloro fluoro, alkyl (especially $C_{1-4}$alkyl) alkoxy (especially $C_{1-4}$alkoxy), hydroxy, sulphamoyl, amine (especially —$NHR^{10}$ and $NR^{10}Ar$), mercapto, thioalkyl (especially $C_{1-4}$thioalkyl), cyano, ester (especially $OCOR^{10}$ or $COOR^{10}$) and amide (especially $CONHR^{10}$ and $NHCOR^{10}$);

where $R^{10}$ is H or optionally substituted $C_{1-6}$alkyl (especially H or $C_{1-4}$alkyl) and Ar is an optionally substituted aromatic ring (especially a benzene ring).

More preferred optional substituents and/or carbyl derived groups in Formula (1) are selected from $SO_3M$, $CO_2M$, $PO_3M_2$, Cl, Br, F, OH, $C_{1-4}$alkyl, $C_{1-4}$alkoxy, $CONH_2$, $SO_2NH_2$, $OCO(C_{1-4}alkyl)$, $COO(C_{1-4}alkyl)$, NHAr and $NHCO(C_{1-4}alkyl)$, where M and Ar are as defined herein.

Certain compounds and/or moieties therein (such as repeat units), which comprise the present invention may exist in many different forms for example at least one form from the following non-exhaustive list: salts (e.g. with organic and/or inorganic acids and/or bases including acid and/or base addition salts); isomers, stereoisomers, enantiomers, diastereoisomers, geometric isomers, tautomers, conformers, zwitterions, forms with regio-isomeric substitution, isotopically substituted forms, polymorphs, polymeric configurations, tactic forms, interstitial forms, complexes, chelates, clathrates, interstitial compounds, non-stoichiometric complexes, stoichiometric complexes, ligand complexes, organometallic complexes, solvates, isotopic forms, mixtures thereof and/or combinations thereof within the same species. The present invention preferably comprises all such forms of compounds, polymers, moieties therein, any compatible mixtures thereof and/or any combinations thereof, which comprise the present invention, preferably those which are effective in IJP and/or colour filters.

Salts of Formula (1) may be formed from one or more organic and/or inorganic bases. Preferred salts of Formula (1) are soluble in water.

The inks preferably contain from 1 to 10, more preferably from 1 to 6, especially from 1 to 3, more especially 1 compound of Formula (1).

The compounds of Formula (1) are preferably soluble in water. However, they may be modified to be soluble in organic solvents by use of a QAC as the counter ion, where QAC is as hereinbefore defined.

The compounds of Formula (1) may be prepared by any suitable method known in the prior art.

The composition may contain further compounds other than those of Formula (1), for example to modify the colour or brightness of the ink.

The compounds of Formula (1) may be used individually as part of a YMC (yellow, magenta, cyan) colour filter, or mixed with other compounds as the red or green component of an RGB (red, green, blue) colour filter. The arrangement of pixels could be any of those known in the art (stripe, mosaic, delta) and the filters would be suitable for displays, especially LCD's, and solid state imaging devices.

Use of the compounds of Formula (1) gives filters with very good fastness properties and brighter than those in the prior art.

The compounds may also be used in an ink-jet printing ink to give bright yellow prints with good fastness properties.

It is another object of the present invention to provide improved inks for processes for forming film coatings, that overcome some or all of the disadvantages of the prior art as discussed above, as well as products made and coated by processes using such inks (in particular colour filters). In particular there is provided a composition according to the first aspect of the invention which is a green, red or yellow ink suitable for use in any of these processes.

Therefore according to another aspect of the present invention, there is provided an ink containing a compound of Formula (1) for use in any process for preparing a patterned, cross-linked, polymer, film coating on a substrate.

It is particularly preferred that the inks of the current invention are used in processes to manufacture a colour filter. These processes may comprise or consist of steps known in methods for producing colour filters (with colorants other than the novel compounds of the present invention). Such processes are well known in the art and include various printing, photolithographic, photographic, electrodeposition, laser ablation and thermal transfer processes. Examples of suitable processes are described below and in the following references, but it is to be understood that the invention is not limited to these processes:

"Reliability Improvements of Dichromated Gelatin Color Filters for TFT-LCD's", A. Endo, E. Hirose, T. Sato, S. Otera, N. Chiba, Polym. Mater. Sci. Eng., 1990, 63, 472–6.

"Process and Material for Color Filter Preparation in Liquid Crystal Display", H. Aruga, J. Photopolym. Sci. Technol., 1990, 3, 9–16.

"Color Filter for Liquid Crystal Display", S. Okazaki, Trans. Inst. Electron. Inf. Commun. Eng., Sect. E, 1988, E71, 1077–9.

P. Gregory, Chapter 2 "Micro Color Filters" in "High-Technology Applications of Organic Colorants", Kluwer Academic/Plenum Publishers, 1991.

"Color Filters for LCDs", K. Tsuda, Displays, 1993, 14, 115–24.

"Printing Color Filter for Active Matrix Liquid Crystal Display Color Filter", K. Mizuno, S. Okazaki, Jpn. J Appl. Phys., Part 1, 1991, 30, 3313–17.

EP 661350 (=U.S. Pat. No. 5,608,091) (Nippon Shokubai)
EP 833203 (Nippon Shokubai)

It will be appreciated that where the compounds described are not water soluble, the processes described in the references may need appropriate modification to allow the use of the compositions and compounds of the present invention. Alternatively, where the colorants described are solvent soluble dyes, compositions and compounds of the present invention may be used by modification of their solubility in organic solvents through appropriate choice of the counter ion as described previously.

A typical process for preparing a patterned, cross-linked, polymer, film coating on a substrate comprising the steps of
(a) applying to the substrate simultaneously and/or sequentially in any order.
   (i) one or more cross-linkable polymer precursor(s);
   (ii) optionally one or more additional cross-linker(s) capable of cross-linking the precursor(s) for the polymer(s); and
   (iii) one or more compound(s) of Formula (1) optionally with one or more other colorant(s);
(b) optionally patterning one or more non cross-linked film(s) of component (i); component (ii); component (iii) and/or mixture(s) thereof, optionally before application of further components; and
(c) initiating cross-linking the mixture of components (i), (ii) in situ, to form an optionally patterned, cross-linked polymeric film coating on the substrate.

Preferably the application method in step (a) comprises applying an ink comprising both components (i) and (ii).

It is also preferred that the polymer precursor(s) in step (a) (i) above comprise water dissipatable polymer precursor(s). It is especially preferred that these water dissipatable polymer precursor(s) comprise acrylic polymer precursor(s).

A process for which the present invention is particularly suitable is a printing process, especially an ink-jet printing (IJP) process.

Preferably the printing process used is thermal or piezo IJP. The principles and procedures for ink jet printing are described in the literature for example in High Technology Applications of Organic Colorants, P. Gregory, Chapter 9 ISBN 0-306-43637-X.

Other suitable printing methods comprise: flexographic printing; off-set printing [e.g. as described in JP-A-10(98)-088055 (Sumitomo Rubber)] lithographic printing; gravure printing; intaglio printing; dye diffusion thermal transfer; screen and/or stencil printing [e.g. as described in WO 97-048117 (Philips Electronics)] and/or using 'typographic ink imaging pins' (e.g. as described in WO 97-002955 (Coming Inc.)].

Preferred methods of applying the polymer precursor and compound of Formula (1) to the substrate comprise one or more of the following:
1) print onto the substrate (advantageously by IJP) a mixture comprising the polymer precursor which is thermally cross-linkable and the colorant; and thereafter curing the mixture in situ (e.g. as described in the applicant's co-pending application GB 9824818.0).
2) Apply to the substrate a polymer precursor which is an anionic colourable photosensitive resin, and then exposing the resin to UV light via a mask to either make the exposed portions, which correspond to the pixels accept colorant; or harden the resin at the exposed portions, which correspond to the black matrix, to make it resistant to colorant; and print onto the resin (advantageously by IJP) a solution of the colorant. [e.g. as described in EP 0703471(Canon)]:

An additional method of applying the ink is by a photolithographic process. This may involve either
1) Apply to a substrate a polymer precursor which is an anionic colourable photosensitive resin; and then expose the resin to radiation (e.g. UV light) through a patterned mask, develop the substrate to remove unexposed portions of the resin, optionally heat to further set the resin, then dip the substrate into an aqueous solution of the colorant. [e.g. as described in U.S. Pat. No. 5,190,845 (Nippon Kayaku)]
2) Apply to a substrate an ink containing a photosensitive resin and the colorant; and then expose the resin to radiation (e.g. UV light) through a patterned mask, develop the substrate to remove either the exposed or unexposed portions of the resin and optionally heat to further set the resin [e.g as described in EP 564237 (Mitsui Toatsu)]
3) Apply to a substrate a non-photosensitive ink containing the colorant and a thermally cross-linkable resin; then apply an ink containing a photosensitive resin over this coloured film; expose the photosensitive resin to radiation (e.g. UV light) through a patterned mask; develop the substrate to remove either the exposed or unexposed portions of the photosensitive resin and the corresponding portions of the coloured film beneath, heat to thermally cure the coloured polymeric film and optionally strip the photosensitive resin that remains [e.g. as described in U.S. Pat. No. 5,176,971 (Kyodo Printing) and WO 88/05180 (Brewer Science Inc.)]

In 1) the photosensitive resin may be either a natural polymer such as gelatin or casein which has been photosensitised by the addition of for example ammonium dichromate, or may be a synthetic polymer.

In 2) and 3) the photosensitive resins used may be of either the positive or negative type. In the positive type, the solubility of the resin in a developing solution increases on exposure to radiation; in the negative type the solubility of the resin in a developing solution decreases on exposure to radiation.

In the laser ablation method, an ink containing a compound of Formula (1) and a (optionally thermally curable) non-photosensitive resin is applied to the substrate, then portions of the substrate are irradiated with a laser beam to selectively remove the ink in those areas through vaporisation and the remaining ink is optionally heated to thermally cure the resin [e.g. as described in JP10274709 (Sekisui Chem Ind.)]

In these processes the inks may be applied to the substrate by any known coating method including spin-coating, bar-coating, dip-coating, curtain-coating, roller-coating and electrospray.

The process of the present invention can be used to give optionally patterned, optionally transparent films and coatings on substrates in general, including substrates which are not transparent. Accordingly the present invention includes a process for preparing polymeric film coatings for substrates in general not just colour filters.

The cross-linked polymeric film coating may be formed on a substrate to which the coating will bond, adhere, absorb or fuse. Preferably (e.g. if the process of the present invention is used to manufacture a colour filter) the substrate is transparent. Suitable transparent substrates include glass; plastics films and plates such as those of polyvinylalcohol, polyester, polyvinylchloride, polyvinylfluoride, polycarbonate, polystyrene, polyamide or polyimide. The substrate may be flexible or may be a flat panel (e.g. as used in many LCD displays). A preferred substrate is glass.

The substrates may be pre-treated to improve bonding, adhesion, absorption, fusion or spreading of the cross-linked polymeric coating on the substrate. Suitable pre-treatments include plasma etching in which the substrate is placed in an oxygen atmosphere and subjected to an electrical discharge or application of an adhesion promoter such as a silane.

An ink suitable for manufacture of a colour filter according to the present invention may be made by any method known in the art and comprise: one or more compounds(s) of Formula (1), one or more solvents and optionally other formulating agents. The inks may in addition contain precursor(s) for cross-linked polymer(s), one or more cross-linker(s) capable of cross-linking the precursor(s), optionally one or more non cross-linkable polymer(s) for improving the film-forming ability of the inks or the properties of the final films and (as appropriate for chemically or photochemically initiated systems) either a radical source, a photopolymerisation initiator or a dissolution inhibitor. An ink coloured in one of the desired colours can be produced with compounds of the present invention and optionally one or more other colorants, typically either yellow, green or red.

Preferably the optionally patterning method in step (b) of the process of the present invention uses electromagnetic radiation, more preferably UV radiation. Optionally to produce a colour filter the pattern formed may comprise of a multiplicity of discrete filter regions (pixels) on a transparent substrate via a single pass ink-jet printing process. Optionally, the transparent substrate has previously been subdivided into discrete pixel regions by any method known in the art (for example formation of a black matrix by photolithography).

The steps of the process of the present invention described herein may be followed for each of the desired colours to form a multi-colour optical filter structure so that the filter structure finally comprises the transparent substrate and a single layer of differently coloured pixels arranged in triads or in any desired groups, each consisting of a predetermined number of differently coloured pixels.

The inks of the present invention are particularly useful for forming the green and red pixels of an additive (red, green and blue [RGB]) colour filter and for forming the yellow pixels of a subtractive (yellow, magenta and cyan [YMC]) colour filter.

A further aspect of the invention provides a process for printing an image on a substrate comprising applying thereto an ink according to another aspect of the present invention, preferably by printing, more preferably by means of an ink jet printer. Preferably the ink comprises solvent (preferably aqueous) and a compound of Formula (1) as described herein.

The ink jet printer preferably applies the ink to the substrate in the form of droplets which are ejected through a small nozzle onto the substrate. Preferred ink jet printers are piezoelectric ink jet printers and thermal ink jet printers. In thermal ink jet printers, programmed pulses of heat are applied to the ink in a reservoir (e.g. by means of a resistor adjacent to the nozzle) thereby causing the ink to be ejected in the form of small droplets directed towards the substrate during relative movement between the substrate and the nozzle. In piezoelectric ink jet printers the oscillation of a small crystal causes ejection of the ink from the nozzle. The term ink-jet printer denotes any device which could use an IJP technique to produce an image.

A further aspect of the present invention provides a substrate which has applied thereon an ink of the present invention as defined herein and/or which has been prepared by the process of the present invention also as defined herein.

The substrate, which is optionally transparent, preferably comprises plastic, metal, glass, paper, an overhead projector slide and/or a textile material. More preferably for a colour filter the substrate is glass. Preferred textile materials for ink jet printing are cotton, polyester and blends thereof. When the substrate is a textile material the process for printing an image thereon according to the invention preferably further comprises the step of heating the resultant printed textile, preferably to a temperature of 50° C. to 250° C.

According to a further feature of this invention there is provided a colour filter comprising red, green and blue filter elements, or yellow, magenta and cyan filter elements, characterised in that the colour filter carries a compound of Formula (1). Preferably the color filter further comprises a coloured cross-linked polymeric coating on a transparent substrate and/or a transparent, coloured, cross-linked, polymer coating on a substrate prepared by the processes according to the present invention.

More preferably the substrate or colour filter comprises an array of coloured trichromatic elements in which the trichromat is selected from: a red, green and blue trichromat; and a cyan, magenta and yellow trichromat.

Preferably the substrate or colour filter has utility as a component for a coloured display.

A further feature of the invention comprises a display containing a substrate or colour filter prepared according to the present invention. Preferably the display comprises a liquid crystal display.

A further feature of the present invention provides a cartridge suitable for use in an ink jet printer containing an ink according to the invention. Also there is provided an ink jet printer containing an ink according to the invention.

The compounds of the present invention are particularly useful as yellow dyes which form particularly good green colorants when combined with a further cyan dye or pigment. Such compositions are particularly useful to produce a green colour filter For the purposes of the present invention the term 'colorant' as used herein denotes perceptible and/or emissive materials. The term "perceptible material" as used herein includes all dyes and/or pigments and denotes materials which absorb radiation substantially in that part of the electromagnetic (EM) spectrum which encompass the infra red (IR); visible and/or ultraviolet (UV) regions, preferably in a region where the radiation wavelength [λ] is from about 200 nm to about 800 nm, more preferably in the visible region which is detectable by the normal, unaided human eye. The term "emissive material" as used herein denotes a material which is capable of emitting radiation, preferably EM radiation, more preferably radiation in the IR, visible and/or UV regions of the EM spectrum. Examples of emissive materials comprise fluorescent, phosphorescent and/or radioactive materials.

Therefore broadly in another aspect of the present invention there is provided a coloured composition comprising a compound of Formula (1) or (2) (as described herein) together with one or more cyan or green dye(s) and/or one or more cyan or green pigments(s).

Preferably the cyan or green dye comprises a water soluble metal phthalocyanine, more preferably a copper, zinc, aluminium and/or nickel phthalocyanine. Preferably the composition of the present invention comprises a cyan dyes of Formula (3)

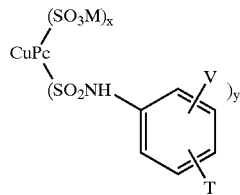

Formula (3)

in which:

T represents H or an optional substituent, preferably H, alkyl, alkoxy, $CO_2M$, $SO_3M$;

V represents $CO_2M$, $SO_3M$ or $PO_3M_2$, especially meta-$CO_2M$ x and y independently represent from 0 to 4, preferably from 1 to 3; and x+y is from 3 to 5, preferably 4;

where M is as given herein for compounds of Formula (1) herein.

Where the cyan or green colorant is a pigment, preferred pigments include C.I. Pigment Green 7 and C.I. Pigment Green 36.

The colorants of the present invention may also be used as shading components in combination with red, magenta and/or orange colorants to produce good red colorants which are useful for producing a red colour filter.

Therefore, in another aspect of the present invention there is provided a coloured composition comprising a compound of Formula (1) (as described herein) together with one or more red, magenta and/or orange colorant(s), [e.g. dye(s) and/or pigment(s)].

It is also to be understood that one or more further yellow colorant(s), [e.g. dye(s) and/or pigment(s)] other than those of the current invention, may be present in the ink for the purpose of adjusting the shade or enhancing the fastness properties of the ink and the resultant film or image produced using the ink.

Apart from the colorants of the present invention of Formula (1) and (2), compositions, inks, colour filters and processes of the present invention may comprise at least one further colorants to form a colorant mixture.

The further colorants (as well as colorants of the present invention) are preferably compatible with the resultant cross-linked polymer coatings, i.e. the resultant cured films have high transparency. Where the colorant is a dye, preferably the colorant is insoluble in organic solvents and soluble in water, for example the colorant may contain sulpho, phospho or carboxy groups.

If the colorant used is not soluble in the solvent used for the ink, the colorant is preferably present as a fine dispersion, prepared by for example milling the colorant in a solvent in a horizontal shaker in the presence of glass or metal beads and a dispersant. Suitable dispersants may comprise an anionic type (for example lignosulphonates and other sulphonated aromatic species) or a non-ionic type (for example alkylene oxide adducts).

Useful classes of further colorants include azos (including metallised azos), anthraquinones, phthalocyanines, perylenes, quinacridones, diketopyrrolopyrroles, pyrrolines, thiophenedioxides, triphenodioxazines, methines, benzofuranones, benzodifuranones, coumarins, indoanilines, benzenoids, xanthenes, triphenylmethanes, nitros, nitrosonaphthols, phenazines, solvent soluble sulphur dyes, quinophthalones, pyridones, aminopyrazoles, pyrollidines, pyrroles, styrylics, maleimides, triphenazonaphthylamines, styryls, dithienes, azomethines, cyanines, indanthrones, benzimidazolones, isoindolinones, isoindolines and azoics.

The Colour Index International lists suitable dyes and pigments for use as further colorants such as acid dyes, direct dyes, basic dyes, reactive dyes, solvent dyes, disperse dyes and pigments and further examples of acid dyes are given in the Colour Index, 3rd Edition, Volume 1, pages 1003 to 1561, further examples of direct dyes are given in Volume 2, pages 2005 to 2478, further examples of basic dyes are given in Volume 1, pages 1611 to 1688, further examples of reactive dyes are given in Volume 3 pages 3391 to 3560, further examples of solvent dyes are given in Volume 3, pages 3563 to 3648, further examples of disperse dyes are given in Volume 2, pages 2479 to 2742, and further examples of pigments are given in Volume 3 pages 3267 to 3390. These colorants are included herein by reference.

Preferably the further colorant(s) is selected from at least one cyan, green, red, magenta and/or orange colorant which is a dye or a pigment.

Subject to the provisos herein, generally preferred colorants are pigments; or dyes which have substituent groups which aid the solubility of the dye(s) in liquid media used in the process or which aid the solubility of the dye(s) in the final cross-linked polymer matrix.

Preferably the composition is an the ink comprising:
(a) from 0.01 to 30 parts of a compound of Formula (1); and
(b) from 70 to 99.99 parts of a liquid medium or a low melting point solid medium; wherein all parts are by weight and the number of parts of (a)+(b)=100.

The number of parts of component (a) is preferably from 0.1 to 20, more preferably from 0.5 to 15, and especially from 1 to 5 parts. Compound A is preferably an IJP effective compound of Formula (1) more preferably of Formula (2). The number of parts of component (b) is preferably from 99.9 to 80, more preferably from 99.5 to 85, especially from 99 to 95 parts.

When the medium is a liquid, preferably component (a) is completely dissolved in component (b). Preferably component (a) has a solubility in component (b) at 20° C. of at least 10%. This allows the preparation of concentrates which may be used to prepare more dilute inks and reduces the chance of the colorant precipitating if evaporation of the liquid medium occurs during storage.

Preferred liquid media include water, a mixture of water and a water miscible organic solvent.

When the medium comprises a mixture of water and an organic solvent, the weight ratio of water to organic solvent is preferably from 99:1 to 1:99, more preferably from 99:1 to 50:50 and especially from 95:5 to 80:20. The liquid medium may comprise water and preferably two or more, more preferably from 2 to 8, water-soluble organic solvents.

The water-miscible organic solvent(s) may comprise any of the following and/or mixtures thereof: $C_{1-6}$-alkanols, preferably methanol, ethanol, n-propanol, isopropanol, n-butanol, sec-butanol, tert-butanol, n-pentanol, cyclopentanol and/or cyclohexanol; amides, preferably linear amides, for example dimethylformamide and/or dimethylacetamide; ketones and/or ketone-alcohols, preferably acetone, methyl ether ketone, cyclohexanone and/or diacetone alcohol; water-miscible ethers, preferably $C_{2-4}$ethers, tetrahydrofuran and/or dioxane; diols, preferably alkylene glycols containing a $C_2$–$C_6$ alkylene group; more preferably C2-12diols (for example pentane-1,5-diol, ethylene glycol, propylene glycol, butylene glycol, pentylene glycol, hexylene glycol); thioglycols preferably thiodiglycol; oligo- and/or poly-alkyleneglycols (for example diethylene glycol, triethylene glycol, polyethylene glycol and/or polypropylene glycol); triols, preferably glycerol and/or 1,2,6-hexanetriol; lower alkyl glycol and polyglycol ethers, preferably $C_{1-4}$alkyl ethers of diols or mono$C_{1-4}$alkyl ethers of $C_{2-12}$diols: {for example 2-methoxyethanol, 2-(2-methoxyethoxy)ethanol, 2-(2-ethoxyethoxy)ethanol, 2-(2-butoxyethoxy)ethanol, 3-butoxypropan-1-ol, 2-[2-(2-methoxyethoxy)ethoxy]ethanol, 2-[2-(2-ethoxyethoxy)ethoxy]ethanol and/or ethyleneglycol monoallyl ether}; cyclic amides, preferably optionally substituted pyrrolidones (for example 2-pyrrolidone, N-methyl-2-pyrrolidone, N-ethyl-2-pyrrolidone, caprolactam and/or 1,3-dimethylimidazolidone); cyclic esters, preferably caprolactone; sulphoxides, preferably dimethyl sulphoxide and/or sulpholane.

More preferred water-soluble organic solvents are selected from: cyclic amides (for example 2-pyrrolidone, dimethyl pyrrolidone, N-methyl-2-pyrrolidone, N-ethyl-2-pyrrolidone N-(2-hydroxyethyl)-2-pyrrolidone and mixtures thereof.); diols, (for example 1,5-pentane diol, ethyleneglycol, thiodiglycol, diethyleneglycol and triethyleneglycol); $C_{1-6}$alkyl ethers of diols (for example 2-methoxy-2-ethoxy-2-ethoxyethanol); $C_{1-6}$-alkyl mono ethers of $C_{2-6}$-alkylene glycols; $C_{1-6}$-alkyl mono ethers of poly($C_{2-6}$-alkylene glycols); and mixtures thereof.

A preferred liquid medium comprises:
(a) from 75 to 95 parts water; and
(b) from 25 to 5 parts in total of one or more solvents selected from: diethylene glycol, 2-pyrrolidone, thiodiglycol, N-methylpyrrolidone, cyclohexanol, caprolactone, caprolactam and pentane-1,5-diol;
where the parts are by weight and the sum of the parts (a)+(b)=100.

Another preferred liquid medium comprises:
(a) from 60 to 80 parts water;
(b) from 2 to 20 parts diethylene glycol; and
(c) from 0.5 to 20 parts in total of one or more solvents selected from:
2-pyrrolidone, N-methylpyrrolidone, cyclohexanol, caprolactone, caprolactam, pentane-1,5-diol and thiodiglycol;
where the parts are by weight and the sum of the parts (a)+(b)+(c)=100.

When the liquid medium comprises an organic solvent free from water, (i.e. less than 1% water by weight) the solvent preferably has a boiling point of from 30° to 200° C., more preferably of from 40° to 150° C., especially from 50 to 125° C. The organic solvent may be water-immiscible, water-miscible or a mixture of such solvents. Preferred water-miscible organic solvents comprise any of those described above and mixtures thereof. Preferred water-immiscible solvents comprise aliphatic hydrocarbons; esters (for example ethyl acetate) chlorinated hydrocarbons (for example dichloromethane), ethers (for example diethyl ether) and mixtures thereof.

When the liquid medium comprises a water-immiscible organic solvent, preferably it comprises a polar solvent (for example a $C_{1-4}$alkanol) to enhance the solubility of the dye in the liquid medium. It is especially preferred that where the liquid medium is an organic solvent free from water it comprises a ketone (especially methyl ethyl ketone) and/or an alcohol (especially a $C_{1-4}$alkanol, more especially ethanol or propanol).

The organic solvent free from water may be a single organic solvent or a mixture of two or more organic solvents. It is preferred that when the medium is an organic solvent free from water it is a mixture of 2 to 5 different organic solvents. This allows a medium to be selected which gives good control over the drying characteristics and storage stability of the ink.

Ink media comprising an organic solvent free from water are particularly useful where fast drying times are required and particularly when printing onto hydrophobic and non-absorbent substrates, for example plastics, metal and glass.

Preferred low melting solid media have a melting point in the range from 60° C. to 125° C. Suitable low melting point solids include long chain fatty acids or alcohols, preferably those with $C_{18-24}$chains, and sulphonamides. The compound of Formula (1) may be dissolved in the low melting point solid or may be finely dispersed in it.

The ink may also contain additional components conventionally used in inks for IJP, for example viscosity and surface tension modifiers, corrosion inhibitors, biocides, kogation reducing additives and surfactants which may be ionic or non-ionic.

In a further aspect of the present invention there is provided a general purpose ink optionally for use in preparing a colour filter, the ink comprising a fluid medium, and one or more compounds of Formula (1) herein. The precursor(s), cross-linker(s) and colorant(s) are as defined previously.

Preferably inks according to the invention are prepared by mixing together (i) a solution of the compound(s) of Formula (1) and optionally water.

The amount of the compound(s) or Formula (1) and solvent contained in the ink will vary according to the depth of shade required. Typically, however, the ink will comprise (a) from 0.5 to 15 parts, more preferably 0.8 to 10 parts, especially 1 to 8 parts in total of one or more compounds of Formula (1);

(b) from 0 to 90 parts, more preferably from 50 to 80 parts of water; and (c) from 0 to 90 parts, more preferably 0 to 60 parts of one or more water miscible organic solvent(s); and (d) other ingredients from 0 to 50 parts, more preferably 0 to 30;

where all parts are by weight and the total number of parts of (a)+(b)+(c)+(d) add up to 100.

The water-miscible solvent may be one or more of those described herein, preferably with a solubility in water at 20° C. of more than 50 g/l.

Instead of parts (b) and (c) [the water and water-miscible organic solvent(s)] the ink may comprise one or more water-immiscible organic solvent(s).

Suitable water-immiscible organic solvents include aromatic hydrocarbons, e.g. toluene, xylene, naphthalene, tetrahydronaphthalene and methyl naphthalene; chlorinated aromatic hydrocarbons, e.g. chlorobenzene, fluorobenzene, chloronaphthalene and bromonaphthalene; esters, e.g. butyl acetate, ethyl acetate, methyl benzoate, ethyl benzoate, benzyl benzoate, butyl benzoate, phenylethyl acetate, butyl lactate, benzyl lactate, diethyleneglycol dipropionate, dimethyl phthalate, diethyl phthalate, dibutyl phthalate, di (2-ethylhexyl) phthalate; alcohols having six or more carbon atoms, e.g. hexanol, octanol, benzyl alcohol, phenyl ethanol, phenoxy ethanol, phenoxy propanol and phenoxy butanol; ethers having at least 5 carbon atoms, preferably $C_{5-14}$ ethers, e.g. anisole and phenetole; nitrocellulose, cellulose ether, cellulose acetate; low odour petroleum distillates; turpentine; white spirits; naphtha; isopropylbiphenyl; terpene; vegetable oil; mineral oil; essential oil; and natural oil; and mixtures of any two or more thereof.

The water-immiscible solvent preferably has a solubility in water at 20° C. of up to 50 g/l.

A further feature of the invention provides a composition comprising a water-dissipatable polymer and a compound of Formula (1). In these compositions the preferred water-dissipatable polymers and dyes are as described in in the following co-pending patent applications WO95/34204, WO99/50326, WO99/50362, WO99/50361, WO00/29493, WO00/37575. These applications are hereby incorporated by reference These applications are hereby incorporated by reference.

Such compositions may be dissipated in water and optionally mixed with further ingredients to give an ink, for example with one or more organic solvents.

The other ingredients may comprise one or more formulating agents conventionally used in inks for example to improve the solubility of colorant in the ink and/or to improve the flow and handling properties of the ink. Thus for example the ink may comprise one or more: humectant(s); rheological agent(s) [such as viscosity modifier(s) and/or surface tension modifier(s), for example wax(es) (e.g. beeswax) and/or clay(s) (e.g. bentonite)]; corrosion inhibitor (s), biocides (such as those available commercially from Avecia Limited under the trade name Proxel GXL or from Rohm and Haas under the trade name Kathon); fungicide(s); kogation reducing additives; IR absorber(s) (such as that available commercially from Avecia Limited under the trade name Projet 900NP); fluorescent brightener(s), (such as C.I. Fluorescent Brightener 179); and surfactant(s) (which may be ionic or non-ionic and include surface active agent(s) wetting agent(s) and/or emulsifier(s) such as those described in McCutcheon's Emulsifiers and Detergents 1996 International Edition or in Surfactants Europa $3^{rd}$ Edition 1996 each of which is incorporated herein by reference).

The ink may also comprise radical scavengers and/or UV absorbers to help improve light and heat fastness of the ink and resultant colour filter. Examples of such additives include: 2-hydroxy-4-methoxy-5-sulfobenzophenone; hydroxy phenylbenzotriazole; 4-hydroxy-TEMPO and transition metal complexes (such as nickel complexes of thiocarbamic acids). These additives are used typically in an amount from 30% to 60% by weight of the colorant, and are further described in "The Effect of Additives on the Photostability of Dyed Polymers", Dyes and Pigments, 1997, 33(3), 173–196 and JP-A-04-240603 (Nippon Kayaku).

For an aqueous ink, the ink preferably has a pH from 3 to 12, more preferably from 4 to 11. The pH selected will depend to some extent on the desired cation for the colorant and the method of application. The desired pH may be obtained by the addition of a pH adjusting agent such as an acid, base or pH buffer. The amount of pH adjuster used will vary according to the desired pH of the ink, but typically a base may be present in an amount of up to 30%. Where a liquid(s) is added to the mixture the printed substrate may be dried by heating or by air drying at ambient temperature to evaporate the liquid before the coating is cured or during curing.

Examples of suitable formulations of polymer precursor and colorant which may be used in the method of the present invention are also given in the applicant's co-pending applications GB 9824818.0 and EP 0764290, where it will be appreciated that the colorants of Formula (1) herein replace some or all of the colorants used in these prior art formulations.

Preferably the ink of the present invention comprises from about 10 to about 99.6, preferably from about 30 to about 99.5, more preferably from about 50 to about 99, parts of the liquid medium; and from about 90 to about 0.4 parts, preferably from about 70 to about 0.5, more preferably from about 50 to about 1, parts of the other ingredients; where all parts are by weight and the number of parts totals 100.

The inks according to a further aspect of the invention may be prepared by mixing the ingredients in any order. Suitable mixing techniques are well known in the art, for example agitation, ultrasonication or stirring of the components. The ingredients may be present in the ink in any form suitable for application to the substrate, for example the form of a dispersion, emulsification, suspension, solution or a combination thereof.

Examples of further media for inks of the present invention comprising a mixture of water and one or more organic solvents are described in U.S. Pat. No. 4,963,189, U.S. Pat. No. 4,703,113, U.S. Pat. No. 4,626,284 and EP 0425150A.

Dyes of the invention will now be illustrated by the following examples in which all parts and percentages are by weight unless specified otherwise. In the Examples (and previously), compounds referred to by reference to CI numbers are the dyestuffs identified by these numbers in the Colour Index International, $3^{rd}$ Edition, $3^{rd}$ Revision. In each of the following Examples, the inks were tested and the results were set out in tables.

EXAMPLE 1

Preparation of:

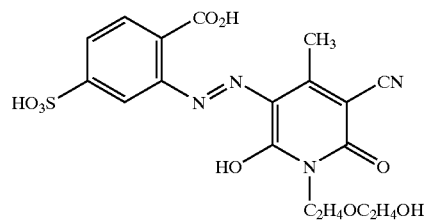

Stage 1(a)

Preparation of the Pyridone Coupler:1-(2'-Hydroxyethoxyethyl)-3-cyano-4-methyl-6-hydroxy-2-pyridone Ethylcyanoacetate (115 parts) was slowly added to 2-(2-aminoethoxy)ethanol (134 parts) with stirring, while maintaining the temperature below 30° C. On completion of the addition, the mixture was heated at 95° C. for 3 hours then cooled back to room temperature. Methyl acetoacetate (123 parts) was added, maintaining the temperature below 30° C., the whole mixture was then cooled to 10° C. before adding ethylamine (57.6 parts). The resultant mixture was heated at 90° C. for 18 hours, then cooled to room temperature. On acidification to pH1 with concentrated hydrochloric acid, the product precipitated out. This was isolated by filtering, washing with a small amount of 2N HCl and finally drying at 60° C. to yield 81 parts of the above pyridone coupler.

Stage 1(b)

Preparation of Title Compound

2-Amino-4-sulphobenzoic acid (27.2 parts) was stirred in water (200 parts) at pH5 until dissolved. The solution was cooled to <10° C. and concentrated HCl (47 parts) was added. Sodium nitrite (6.8 parts) was slowly added and the reaction mixture was stirred at 0–10° C. for 30 minutes. Excess nitrous acid was then removed by addition of sulphamic acid, until the diazo mixture was negative to starch-iodide. To this was added a solution of the pyridone coupler (53 parts) from Stage 1 (a) in water (200 parts), which had been adjusted to pH8 with 2N NaOH. The temperature of the reaction mixture was maintained below 10° C. during the addition. The mixture was then stirred for 16 hours whilst warming to room temperature. The dark yellow solution was acidified to pH 1 with concentrated HCl and the resultant precipitate was collected by filtration. The precipitate was re-dissolved in water (200 parts), and adjusted to pH9 with 0.88 S.G. ammonia. The product was then re-precipitated by pouring on to concentrated HCl (35 parts) and collected by filtration. The product was dissolved in ammonia and re-precipitated and collected by filtration once more. Finally the product was dissolved in water (200 parts) containing ammonia at pH9, dialysed to remove the inorganic components, screened through a 0.45μ filter and dried at 60° C. to yield the title compound as a yellow powder of its ammonium salt (7.7 parts).

The following dyes were made by an analogous method to that described in Example 1:

| Ex | $R^1$ | $R^2$ | $R^3$ |
|---|---|---|---|
| 2 | H | $SO_3H$ | $^nBu$ |
| 3 | $SO_3H$ | H | $^nBu$ |
| 4 | H | $SO_3H$ | 2-Ethylhexyl |
| 5 | $SO_3H$ | H | 2-Ethylhexyl |
| 6 | H | $SO_3H$ | $C_2H_4OH$ |
| 7 | H | $SO_3H$ | $C_2H_4NH_2$ |
| 8 | H | $SO_3H$ | $CH_2C(CH_3)_3$ |
| 9 | H | $SO_3H$ | $C_2H_4Oet$ |
| 10 | H | $SO_3H$ | Cyclohexyl |
| 11 | H | $SO_3H$ | n-Hexyl |
| 12 | H | $SO_3H$ | $C_3H_6Oet$ |
| 13 | H | $SO_3H$ | $C_5H_{10}OH$ |
| 14 | $SO_3H$ | H | $C_2H_4OC_2H_4OH$ |
| 15 | $SO_3H$ | H | $C_3H_6OH$ |
| 16 | $SO_3H$ | H | $C_2H_4Oet$ |

Example 17

Preparation of

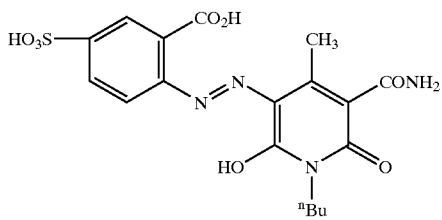

Stage 17(a)

Preparation of the Pyridone Coupler:1-"Butyl-3-carbonamido-4-methyl-6-hydroxy-2-pyridone 1-"Butyl-3-cyano-4-methyl-6-hydroxy-2-pyridons (103 parts) was added carefully to 1.84 S.G. sulphuric acid (370 parts), maintaining the temperature below 50° C. After the addition was complete the temperature was raised to 75° C. for 12 hours. The reaction mixture was allowed to cool to room temperature, then drowned out onto ice (400 parts). The solution was carefully neutralised with calcium carbonate and screened; the solids were further washed through with copious amounts of water and ethanol. Finally, the solution was evaporated to dryness under reduced pressure and the solids dried at 60° C. to give the above pyridone coupler as a light gray powder (122 parts).

Stage 17(b)

Preparation of Title Compound

The title compound was made in an analogous manner to the dyestuff in Example 1, substituting a molar equivalent of the pyridone coupler from Stage 17(a) for the coupler used in Example 1 Stage 1(b), and a molar equivalent of 2-amino-5-sulphobenzoic acid for the diazo component used in Example 1 Stage 1(b).

The following dyes were made by an analogous method to that described in Example 17:

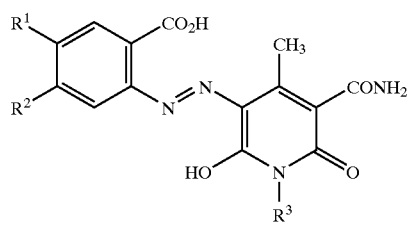

| Ex | $R^1$ | $R^2$ | $R^3$ |
|----|-------|-------|-------|
| 18 | $SO_3H$ | H | $C_2H_5$ |
| 19 | $SO_3H$ | H | 2-Ethylhexyl |
| 20 | $SO_3H$ | H | $^nPr$ |
| 21 | H | $SO_3H$ | $^nPr$ |
| 22 | H | $SO_3H$ | $^nBu$ |

Example 23

Preparation of

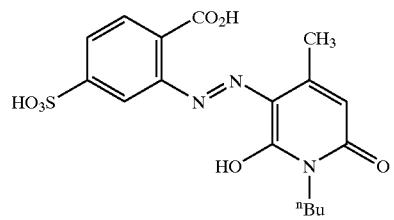

Stage 23(a)

Preparation of the Pyridone Coupler 1-("Butyl)-4-methyl-6-hydroxy-2-pyridone 1-("Butyl)-3-cyano-4-methyl-6-hydroxy-2-pyridone (20.6 parts) was added slowly to 75% sulphuric acid (40.6 parts). After addition the solution was heated at 125° C. for 3 hours then cooled back to room temperature. The thick oil was poured onto ice (200 parts) with good stirring. 47% Sodium hydroxide solution was then carefully added until the product started to solidify. After stirring for a further 30 minutes, the solid was collected by filtration and dried at 60° C. to yield the title pyridone coupler as a brown powder (17.5 parts).

Stage 23(b)

Preparation of Title Compound

The title compound was made in an analogous manner to the dyestuff in Example 1, substituting a molar equivalent of the pyridone coupler from Stage 23(a) for the coupler used in Example 1 Stage 1(b).

Example 24

Preparation of

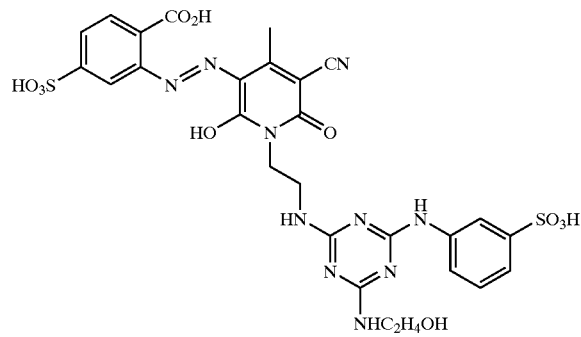

Stage 24(a)

Preparation of the Pyridone Coupler:1-(2'-aminoethyl)-3-cyano4-methyl6-hydroxy-2-pyridone This coupler was made in an analogous manner to that described in Example 1 Stage 1(a), substituting ethylene diamine (5 times molar excess) for the 2-(2-aminoethoxy) ethanol.

Stage 24(b)

Preparation of the Intermediate: 5-(2'-Carboxy-5'-sulphophenylazo)-1-(2'-aminoethyl)-3-cyano-4-methyl-6-hydroxy-2-pyridone This intermediate was made in an analogous manner to the dyestuff in Example 1, substituting a molar equivalent of the pyridone coupler from Stage 24(a) for the coupler prepared in Example 1 Stage 1(a).

Stage 24(c)
Preparation of the Title Compound

Cyanuric chloride (2.6 parts) was dissolved in acetone (20 parts) and poured onto ice/water (100 parts) at 0–5° C. A solution of metanilic acid (2.4 parts) in water (50 parts) at pH7 was then added to the cyanuric chloride suspension, maintaining the reaction at 0–5° C. and pH6. The mixture was stirred under these conditions for 2 hours. To this was then added a solution of 5-(2'-carboxy-5'-sulphophenylazo)-1-(2'-aminoethyl)-3-cyano-4-methyl-6-hydroxy-2-pyridone (5.2 parts) prepared as described in Stage 24(b), in water (100 parts) at pH8.5, the mixture being stirred at pH8.5, 45° C. for 12 hours. After cooling to room temperature the solution was acidified to pH 1 with concentrated HCl, and the solid was collected by filtration, dialysed and dried. This intermediate (8.7 parts) was then re-dissolved in water (400 parts) and ethanolamine (4.6 parts) was added. The solution was then heated at 70° C. for 6 hours. After cooling to room temperature, the product was precipitated by acidifying to pH 1 with concentrated HCl and was collected by filtration. It was then re-dissolved in water (200 parts), adjusted to pH9 with 0.88S.G. ammonia and re-precipitated by pouring on to concentrated HCl (35 parts). After stirring for 10 minutes the product was collected by filtration then re-dissolved in ammonia and re-precipitated with concentrated HCl once more. After collection by filtration, the product was dialysed, screened through a 0.45μ filter and dried at 60° C. to yield the ammonium salt of the title dye as a yellow powder (3.3 parts).

Example 25
Preparation of

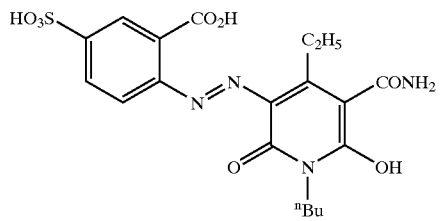

Stage 25(a)
Preparation of the Intermediate Pyridone Coupler:1-$^n$Butyl-3-cyano-4-ethyl-6-hydroxy-2-pyridone Ethylcyanoacetate (57 parts) was slowly added to n-butylamine (40 parts) with stirring, while maintaining the temperature below 30° C. On completion of the addition, the mixture was heated at 95° C. for 3 hours then cooled back to room temperature. Methyl propionylacetate (65 parts) was then added followed by ethylamine (29 parts), maintaining the temperature below 30° C. the whole time. The resultant mixture was heated at 90° C. for 18 hours, then cooled to room temperature. The solution was poured slowly on to ice (400 parts) and adjusted to pH1 with concentrated hydrochloric acid to produce a sticky solid. The supernatant liquid was decanted off and the solid dried under vacuum to yield 80 parts of the above intermediate

Stage 25(b)
Preparation of the Pyridone Coupler: 1-$^n$Butyl-3-cyanamido-4-ethyl-6-hydroxy-2-pyridone The intermediate coupler (66 parts) from Stage 25 (a) was added slowly to 1.84 S.G. sulphuric acid (220 parts), maintaining the temperature below 50° C. After the addition was complete, the temperature was raised to 70° C. for 8 hours. The reaction mixture was allowed to cool to room temperature, then drowned out into an ice/water mixture with vigorous stirring. The solid which precipitated out was isolated by filtration and dried at 60° C. to yield the above coupler as an off-white powder (91 parts).

Stage 25(c)
Preparation of Title Compound

The title compound was made in an analogous manner to the dyestuff in Example 1, substituting a molar equivalent of the pyridone coupler from Stage 25(b) for the coupler prepared in Example 1 Stage 1(a), and a molar equivalent of 2-amino-5-sulphobenzoic acid for the diazo component used in Example 1 Stage 1 (b).

For the purpose of evaluating the spectra and resistance properties of formulations containing the dyes, the inks were bar-coated on to microscope slides using a No.1 K-bar (RK Print-Coat Instruments Ltd.), and the slides cured at 200° C. for 15 minutes. The resultant films had a thickness of approximately 2 μm.

Example 26

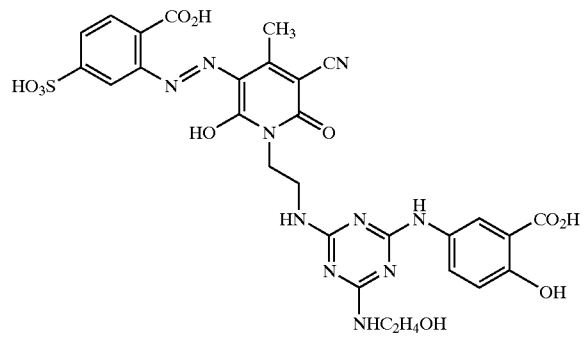

Example 26 was prepared as in Example 24 except that in Stage 24 (c) 5-aminosalicylic acid was used in place of metanilic acid Comparative Dye A Comparative dye A was prepared as in Stage 1(b) except that 2-aminophenol-4-sulphonic acid was reacted with 1-n-butyl-3-cyano-4-methyl-6-hydroxy-2-pyridone.

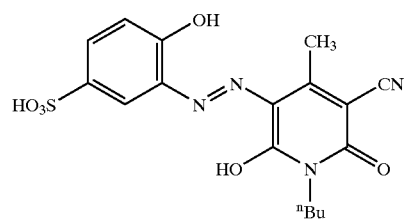

Comparative Dye B

Comparative dye B was prepared by forming a pyridone coupler as in Stage 1 (a) except that 2-ethylhexylamine was used in place of 2-(2-aminoethoxy)ethanol and then preparing the compound as in Stage 1(b) except that aniline-2,5-disulphonic acid was used in place of 2-amino-4-sulphobenzoic acid.

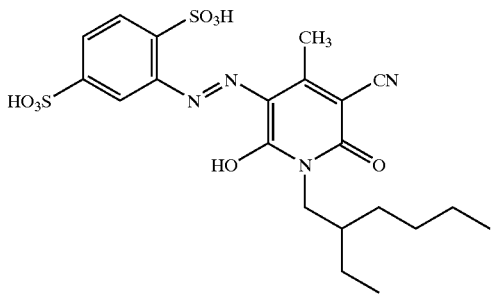

Comparative Dye C

Comparative dye C was prepared using the coupler as prepared as comparative dye B but using 3-amino-4-sulphophenyl phosphonic acid in place of 2-ethylhexylamine in Stage 1(b).

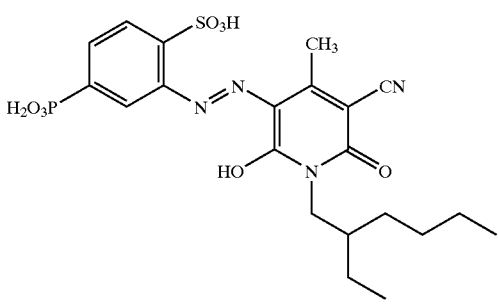

Comparative Dye D

Comparative dye D was prepared as in Example 6 of WO9829513.

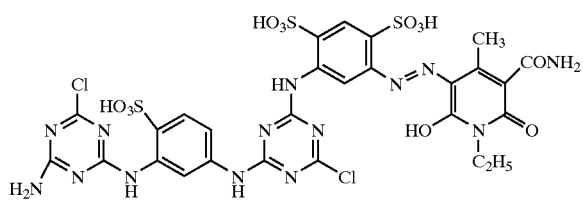

Inks with the following formulation were made (all parts by weight):

| | |
|---|---|
| Acrylic co-polymer (54% methyl methacrylate; 46% methacrylic acid) | 13.2 parts |
| Primid XL552 - ex EMS Chemie | 4.4 parts |
| 2-Amino-2-methyl-1-propanol | 13.2 parts |
| Dye | 3.0 parts |
| Ammonium dodecylbenzenesulphonate | 0.9 parts |
| Water | 65.3 parts |

The inks gave very bright yellow films with high transmission at 520 nm and low transmission at 420 nm. Transmission was determined by measuring the spectra of the coloured films against a blank glass reference using a Minolta CM-3600d spectrophotometer. Light fastness properties were measured using a xenon lamp in an Atlas weatherometer Ci35A (lamp power 0.80 Wm$^{-2}$ at 420 nm, black panel 63° C., wet bulb depression 16° C.), and the ΔE values were determined using a Minolta CM-3600d spectrophotometer. The transmission and light fastness results are tabulated below.

| Ink Ex | Dye | % T @ 420 nm | % T @ 520 nm | LF - ΔE/100 hours[1] |
|---|---|---|---|---|
| 26 | 1 | 2 | 94 | 24.8 |
| 27 | 2 | 0 | 93 | 20.1 |
| 28 | 3 | 1 | 94 | 44.2 |
| 29 | 4 | 4 | 93 | 45.8 |
| 30 | 6 | 1 | 90 | 42.6 |
| 31 | 9 | 0 | 90 | 28.5 |
| 32 | 11 | 0 | 93 | 45.3 |
| 33 | 12 | 1 | 95 | 30.2 |
| 34 | 13 | 4 | 96 | 30.0 |
| 35 | 14 | 0 | 89 | 41.2 |
| 36 | 15 | 1 | 95 | 36.1 |
| 37 | 16 | 3 | 95 | 20.1 |
| 38 | 17 | 0 | 97 | 35.2 |
| 39 | 18 | 2 | 98 | 30.9 |
| 40 | 19 | 1 | 98 | 33.4 |
| 41 | 20 | 0 | 98 | 40.9 |
| 42 | 21 | 2 | 99 | 48.5 |
| 43 | 22 | 0 | 98 | 30.1 |
| 44 | 23 | 0 | 98 | 43.8 |
| 45 | 24 | 7 | 87 | 28.6 |
| 46 | 25 | 0 | 99 | 33.8 |
| Comp. 1 | A | 14 | 65 | 77.3 |
| Comp. 2 | B | 4 | 95 | 57.6 |

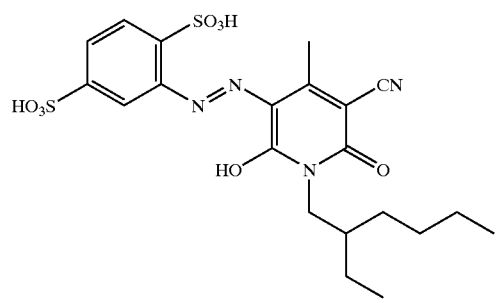

Example 47 and Comparative Example 3

Inks with the following formulation were made (all parts by weight):

| | |
|---|---|
| Acrylic co-polymer (34% methyl methacrylate; 46% methacrylic acid 20% hydroxyethyl methacrylate) | 13.2 parts |
| Primid XL552 - ex EMS Chemie | 4.1 parts |
| 0.88 S.G. ammonia | 12.3 parts |
| C.I. Reactive Blue 14 | 1.9 parts |
| Pyridone dye | 3.3 parts |
| Ammonium dodecylbenzenesulphonate | 0.4 parts |
| Triethyleneglycol monobutyl ether | 0.9 parts |
| Water | 64.8 parts |

The inks produced bright green highly transparent films, but the one made using a dye of this invention had far superior light fastness:

| Example | Pyridone dye | LF = ΔE/100 hrs |
|---|---|---|
| 47 | 4 | 10.6 |
| Comp 3 | C | 62.4 |

Examples 48 to 53

Inks similar to that used in Example 47 were made, using an alternative cyan component (all parts by weight):

| | |
|---|---|
| Acrylic co-polymer (34% methylmethacrylate; 46% methacrylic acid 20% hydroxyethyl methacrylate) | 11.5 parts |
| Primid X1552 - ex EMS Chemie | 3.9 parts |
| 0.88 S.G. ammonia | 11.5 parts |
| Cyan D[1] | See Table |
| Pyridone dye of the present invention | See Table |
| Ammonium dodecylbenzenesulphonate | 0.4 parts |
| Triethyleneglycol monobutyl ether | 2.9 parts |
| Water | to 100 parts |

All the inks produced bright green highly transparent films, but the ones made using dyes of this invention had far superior light fastness:

The cyan dye D had the following structure

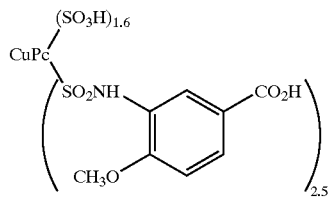

Chromaticity (Y) values were measured on a Minolta CM-3600d spectrophotometer using a C light source and 2° observer.

| Example | Dye (% w/w) | Cyan D (% w/w) | Y | x | y | % T @ 540 nm | LF = ΔE/ 100 hrs |
|---|---|---|---|---|---|---|---|
| 48 | 1 (2.3) | 2.5 | 59.7 | 0.315 | 0.557 | 84 | 13.8 |
| 49 | 2 (2.5) | 3.0 | 59.1 | 0.311 | 0.560 | 83 | 16.9 |
| 50 | 9 (2.0) | 2.5 | 59.1 | 0.306 | 0.550 | 83 | 15.1 |
| 51 | 17 (3.0) | 2.0 | 55.0 | 0.287 | 0.578 | 80 | 13.3 |
| 52 | 23 (4.5) | 1.5 | 55.2 | 0.301 | 0.571 | 78 | 14.0 |
| 53 | 26 (2.9) | 2.0 | 51.0 | 0.319 | 0.570 | 76 | 11.2 |
| Comp. 4 | E (4.5) | 1.5 | 58.6 | 0.298 | 0.560 | 83 | 42.3 |

Example 54

A photocurable ink was produced by mixing together NeoRad™ R441 (50 parts; 33% solids UV-curable resin commercially available from Avecia Ltd.), NeoCryl™ BT-175 (5 parts; 40% solids acrylic resin commercially available from Avecia Ltd.), 0.88 S.G. ammonia (2 parts), CGI 1700 (1 part; photoinitiator commercially available from Ciba), azopyridone dye of Example 3 (5 parts) and water (37 parts). The ink was applied to a glass substrate by bar-coating and exposed to UV-light through a photomask. The unexposed portions of the film were then removed using a 1% sodium carbonate solution at 25° C. and the remaining resin thermally cured at 150° C. for 30 minutes to produce a bright yellow patterned film.

Example 55

To an ink base comprising 90 parts water and 10 parts 2-pyrrolidone was added the dye of Example 2 to give a 4% solution of the dye in the ink base. The solution was then adjusted to pH 10 using sodium hydroxide and filtered through a 0.45μ membrane.

When this was applied to paper using an ink-jet printer, strong bright yellow prints were obtained with excellent fastness properties.

Further Inks for Colour Filters

Further inks which are suitable for making colour filters may be prepared having the formulations described in Tables I to VII below where the numbers,denote parts by weight of each ingredient in the formulation. The compounds used may be in their free acid form and/or in the form of any ffective salt. The number in the column headed compound is an example number of a dye of the invention described herein with the number in brackets being the amount used (w/w). The following abbreviations are also used in the tables:

| | | |
|---|---|---|
| DB199 = Direct Blue 199 | DB86 = Direct Blue 86 | DB87 = Direct Blue 87 |
| AB9 = Acid Blue 9 | RB15 = Reactive Blue 15 | CD = cyan D as given herein |
| PAA = Poly(acrylic acid) of $M_W$ 2000 | | X = Primid XL552 |
| TEA = Triethanolamine | TMP = Trimethylolpropane | W= Water |
| NMP = N-methyl-2-pyrrolidone | | 2P = 2-pyrrolidone |
| BE Butoxyethanol | DEG = Diethylene glycol | GBL = γ-butyrolactone |
| ADBS = Ammonium dodecylbenzene sulphonate | | |
| SDBS = Sodium dodecylbenzene sulphonate | | |
| SURF = Surfynol 465 (Non-ionic surfactant available from Air Products) | | |
| AMP = 2-Amino-2-methyl-1-propanol | | AM = Ammonia (0.88 S.G.) |
| HT = 4-Hydroxy-TEMPO; and | | |
| HMBS = 2-Hydroxy-4-methoxy-5-sulfobenzophenone. | | |

TABLE I

| Compound | DB-199 | DB86 | PAA | X | W | BE | ADBS | AMP | AM |
|---|---|---|---|---|---|---|---|---|---|
| 1(0.5) | 3 | | 15 | 5.5 | 60 | | 1 | 15 | |
| 2(0.25) | | 3. | 12 | 4 | 69.25 | 5 | 0.5 | | 6 |
| 12(1) | 3 | | 12 | 6 | 62 | 5 | 1 | | 10 |
| 4(0.2) | 2 | | 4 | 1 | 88.8 | | 1 | 3 | |
| 5(0.5) | | 4 | 10 | 2 | 74.5 | 2 | | | 7 |
| 14(0.3) | 3.5 | | 12.5 | 4 | 61.4 | 5 | 0.8 | 12.5 | |
| 7(1) | | 1.5 | 8 | 2 | 80.5 | 2 | | 5 | |
| 8(0.1) | 2 | 0.9 | 11.5 | 6.5 | 63 | 5 | | | 11 |
| 6(3) | | 0.5 | 13.7 | 4.3 | 63.8 | | 0.7 | 14 | |
| 10(0.2) | 2.8 | | 15 | 5 | 61 | | 1 | | 15 |

TABLE II

| Compound | DB-199 | PAA | X | TEA | TMP | W | 2P | ADBS | AM |
|---|---|---|---|---|---|---|---|---|---|
| 17(0.5) | 4 | 14 | 5 | | | 61.5 | | 1 | 14 |
| 22(0.5) | 4 | 10.5 | 2.5 | | | 70 | 4 | 0.5 | 8 |

TABLE II-continued

| Compound | DB-199 | PAA | X | TEA | TMP | W | 2P | ADBS | AM |
|---|---|---|---|---|---|---|---|---|---|
| 15(0.25) | 3.5 | 15 | | 5 | | 60.5 | | 0.75 | 15 |
| 24(0.1) | 2.9 | 12 | | | 3 | 67 | 5 | | 10 |
| 13(2) | 0.5 | 12 | 2 | | 2 | 76 | | 0.5 | 5 |
| 11(0.1) | 0.9 | 8 | 5 | | | 81 | 1 | | 4 |
| 16(0.1) | 3 | 15 | | 5 | | 63 | | 0.9 | 13 |

TABLE III

| Compound | DB199 | PAA | TMP | W | 2P | DEG | GBL | SURF | SDBS | AMP |
|---|---|---|---|---|---|---|---|---|---|---|
| 18(0.5) | 4 | 16 | 4 | 54.5 | | | 5 | 1 | | 15 |
| E(2.9) | 0.1 | 12 | 3 | 71.2 | | | | | 0.8 | 10 |
| 19(3) | 2 | 14 | 7 | 49 | 5 | 5 | | | | 15 |
| 20(0.1) | 1 | 4 | 1 | 87.4 | 0.5 | | 1.5 | 0.5 | | 4 |
| 20(0.5) | 1.5 | 8 | 3 | 80.5 | 2 | | | | 0.5 | 4 |

TABLE IV

| Compound | AB9 | CD | PAA | X | W | DEG | SURF | AMP | AM |
|---|---|---|---|---|---|---|---|---|---|
| 19(3) | 2 | | 10 | 5 | 69 | | 1 | | 10 |
| 25(3) | 1.5 | | 14.5 | 5 | 62.5 | 3 | 0.5 | 10 | |
| 21(1) | | 4 | 18 | 7 | 50 | 5 | | 15 | |
| 22(3) | 1 | 1 | 12 | 4 | 64.5 | 2 | 0.5 | | 12 |
| 8(2.5) | | 2.5 | 15 | 7.5 | 56.5 | | 1 | 15 | |
| 18(1) | | | 10 | 5 | 74.2 | | 0.8 | | 7 |
| 10(2) | 2 | | 10 | 3.5 | 67.5 | 5 | | | 10 |
| 11(2) | | 4 | 15 | 5 | 63.3 | | 0.7 | 10 | |

TABLE V

| Compound | AB9 | RB15 | PAA | X | W | BE | GBL | SURF | SDBS | AM |
|---|---|---|---|---|---|---|---|---|---|---|
| 12(5) | 2 | | 13 | 4 | 55.2 | 5 | | | 0.8 | 15 |
| 13(3) | | 2 | 15 | 5 | 59 | | 5 | | 1 | 10 |
| 23(1) | | 2 | 8 | 4 | 74.5 | 2.5 | 2.5 | 0.5 | | 5 |
| 6(0.5) | 2 | | 10 | 3 | 69.5 | 4 | | 0.5 | 0.5 | 10 |
| 16(2) | | 2 | 15 | 7.5 | 52.5 | | | | 1 | 20 |

TABLE VI

| Compound | DB87 | RB15 | PAA | X | W | HT | HMSB | ADBS | AM |
|---|---|---|---|---|---|---|---|---|---|
| 17(0.25) | 3.5 | | 13.5 | 4 | 63.5 | 1.75 | | 0.5 | 14 |
| 18(0.1) | | 2.9 | 15 | 5 | 60 | 1 | | 1 | 15 |
| E(0.5) | 3.5 | 0.5 | 12 | 6 | 65.5 | | | | 12 |
| 1(0.25) | 4.75 | 0.25 | 12 | 5 | 66.9 | | | 0.85 | 10 |
| 2(2) | | 0.5 | 12.5 | 4 | 68 | | 1 | | 12 |
| 3(1) | | 1.5 | 15 | 4.5 | 65.5 | 1 | 0.5 | 1 | 10 |
| 4(0.3) | 3 | | 12 | 4 | 67.8 | | | 0.9 | 12 |

TABLE VII

| Compound | CD | PAA | X | TEA | W | HT | HMSB | NMP | BE | ADBS | AM |
|---|---|---|---|---|---|---|---|---|---|---|---|
| 21(1) | 3 | 15 | 5 | | 53.5 | 2 | | 5 | | 0.5 | 15 |
| 21(2) | 3 | 12 | | 5 | 64 | 1 | 1 | | 2 | | 10 |
| 3(0.5) | 4.5 | 12 | 2 | 2 | 64 | | 2.5 | 2 | 2 | 0.5 | 8 |
| 4(0.2) | 2.3 | 13 | 4.5 | | 63.5 | 1.5 | | | | 1 | 14 |

Further Inks for Ink Jet Printing

The inks described in Tables VII and IX may be prepared wherein the compound described in the first column is the compound made in the above example of the same number. Numbers quoted in the second column onwards refer to the number of parts of the relevant ingredient and all parts are by weight. The inks may be applied to paper by thermal or piezo ink jet printing.

The following abbreviations are used in Table I and II:
PG=propylene glycol
DEG=diethylene glycol
NMP=n-methyl pyrollidone
DMK=dimethylketone
IPA=isopropanol
MEOH=methanol
2P=2-pyrollidone
MIBK=methylisobutyl ketone
P12=propane-1,2-diol
BDL=butane-2,3-diol
CET=cetyl ammonium bromide
PHO=NA$_2$HPO4 and
TBT=tertiary butanol
TDG=thiodiglycol

What is claimed is:

1. A compound of Formula (1)

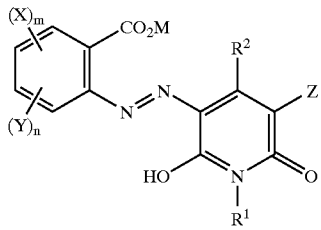

Formula (1)

in which:

$R^1$ represents a group of Formula A:

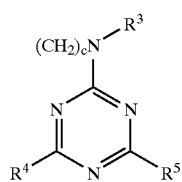

Formula A where:

c is from 2 to 6;

$R^3$ represents H or optionally substituted $C_{1-8}$carbyl derived group;

$R^4$ and $R^5$ independently represent an optional substituent;

$R^2$ represents an optionally substituted $C_{1-8}$carbyl derived group;

X, Y and Z independently represent H or an optional substituent;

M represents H or a cation; and m and n independently represent 0, 1 or 2.

2. A compound of Formula (2):

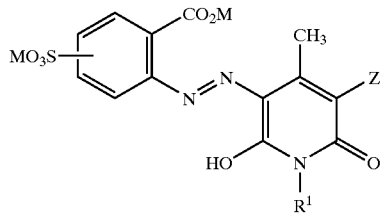

in which:

M represents H or a cation;

Z is $CONH_2$, or CN; and $R^1$ is optionally substituted $C_{2-8}$alkyl or a glycol group.

3. A composition comprising an organic solvent free from water or water and one or more water soluble organic solvent(s), and at least one compound of Formula (1):

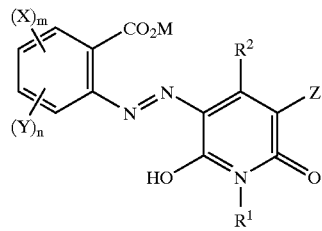

Formula (1)

in which:

$R^1$ represents H, an optionally substituted $C_{1-8}$carbyl derived group, or a group of Formula A:

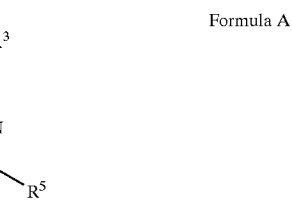

Formula A where:

c is from 2 to 6;

$R^3$ represents H or optionally substituted $C_{1-8}$carbyl derived group;

$R^4$ and $R^5$ independently represent an optional substituent;

$R^2$ represents an optionally substituted $C_{1-8}$carbyl derived group;

X, Y and Z independently represent H or an optional substituent;

M represents H or a cation; and m and n independently represent 0, 1 or 2.

4. A composition according to claim 3, which comprises at least one further colorant.

5. A composition according to claim 4, where the further colorant is a cyan dye of Formula (3)

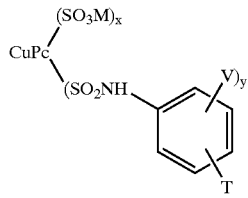

Formula (3)

in which:

T represents H or an optional substituent;

V represents $CO_2M$, $SO_3M$, or $PO_3M_2$;

M represents H or a cation;

x and y independently represent 0 to 4; and x+y is from 3 to 5.

6. A composition according to claim 4, where the further colorant is selected from C.I. Pigment Green 7 and C.I. Pigment Green 36.

7. A process for preparing a patterned, cross-linked, polymer, film coating on a substrate comprising the steps of
 (a) applying to the substrate simultaneously and/or sequentially in any order:
  (i) one or more cross linkable polymer precursor(s);
  (ii) optionally one or more additional cross-linker(s) capable of cross-linking the precursor(s) for the polymer(s); and (iii) one or more compound(s) of Formula (1) as described in claim 4 optionally with one or more colorant(s);
(b) optionally patterning one or more non cross-linked film(s) of component (i); component (ii); component (iii) and/or mixture(s) thereof, optionally before application of further components; and
(c) initiating cross-linking the mixture of components (i), (ii) in situ, to form an optionally patterned, cross-linked polymeric film coating on the substrate.

8. A process according to claim 7, in which the process comprises a printing process.

9. A process according to claim 8, in which the printing process is an ink-jet printing process.

10. A process according to claim 8, in which the printing process comprises a photolithographic process.

11. A process according to claim 9, in which the polymer precursor(s) comprise water dissipatable polymer precursor(s).

12. A substrate obtainable by a process as claimed in claim 7.

13. A substrate according to claim 12, which comprises: a colour filter comprising a coloured, cross-linked, polymer coating on a transparent substrate; and/or a transparent, coloured, cross-linked, polymer coating on a substrate.

14. A display which comprises a substrate according to claim 12.

15. A cartridge suitable for use in an ink jet printer containing an ink according to claim 3.

16. A paper, overhead projector slide, textile or colour filter printed with a composition according to claim 3.

17. A colour filter comprising red, green and blue filter elements, or yellow, magenta and cyan filter elements, wherein the filter carries a compound of Formula (1) as defined in claim 3.

* * * * *